United States Patent [19]
Goldberg

[11] Patent Number: 5,321,642
[45] Date of Patent: Jun. 14, 1994

[54] SOURCE OF QUANTIZED SAMPLES FOR SYNTHESIZING SINE WAVES

[75] Inventor: Bar-Giora Goldberg, San Diego, Calif.

[73] Assignee: Sciteq Electronics, Inc., San Diego, Calif.

[21] Appl. No.: 995,342

[22] Filed: Dec. 22, 1992

Related U.S. Application Data

[63] Continuation of Ser. No. 672,363, Mar. 20, 1991, abandoned.

[51] Int. Cl.[5] .............................................. G06F 7/38
[52] U.S. Cl. ..................................... 364/721; 364/719
[58] Field of Search ............... 364/721, 718, 724.01, 364/724.06, 724.08, 719

[56] References Cited

U.S. PATENT DOCUMENTS

| | | | |
|---|---|---|---|
| 4,482,974 | 11/1984 | Kovalick | 364/718 |
| 4,482,975 | 11/1984 | King et al. | 364/718 |
| 4,905,177 | 2/1990 | Weaver, Jr. et al. | 364/721 |

Primary Examiner—Jerry Smith
Assistant Examiner—Chuong D. Ngo
Attorney, Agent, or Firm—Thomas J. Tighe

[57] ABSTRACT

Convergent and extrapolated samples are provided for synthesizing sine waves. In a first embodiment, memory having the sine function, sin(x), mapped therein provides convergent samples. Memory size is reduced in a second embodiment by summing the outputs of two memories to produce convergent samples, one memory having an auxiliary function, f(x), mapped therein and a second having the sine function less the auxiliary function, sin(x)-f(x), mapped therein. A sine wave quadrant is conceptually divided into a plurality of uniform phase sectors demarked by boundaries phases. Additional memory provides extrapolation value sets uniquely associated with the sectors. In a given sector, extrapolation samples are produced by serially adding values of the associated extrapolation set to the convergent samples selected in the sector. An auxiliary function is chosen to closely approximate the sine function at at least the sector boundary phases, the difference between it and the sine function never exceeding the dynamic range of the sin(x)-f(x) memory. Each extrapolation value set can define a ramp having a slope closely matching the sine function slope within the set's associated sector. The first embodiment's extrapolation sets are derived from the second terms of Taylor Series expansions of the sine function at sector boundary phases. The second embodiment's extrapolation sets can be likewise derived but are adjusted as needed to compensate for quantization errors introduced by truncating the f(x) samples and limiting there number, both done to reduce memory size.

20 Claims, 3 Drawing Sheets

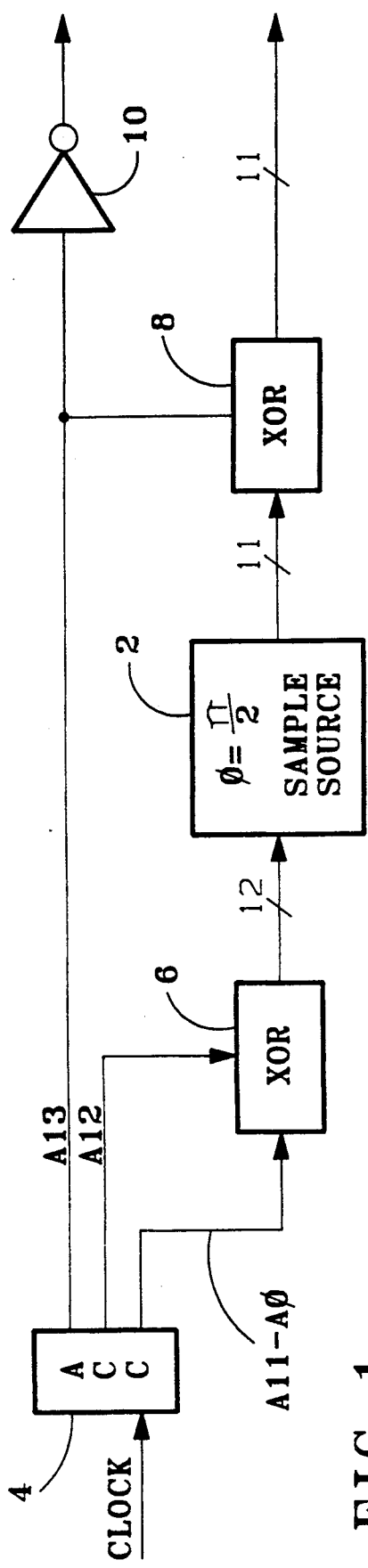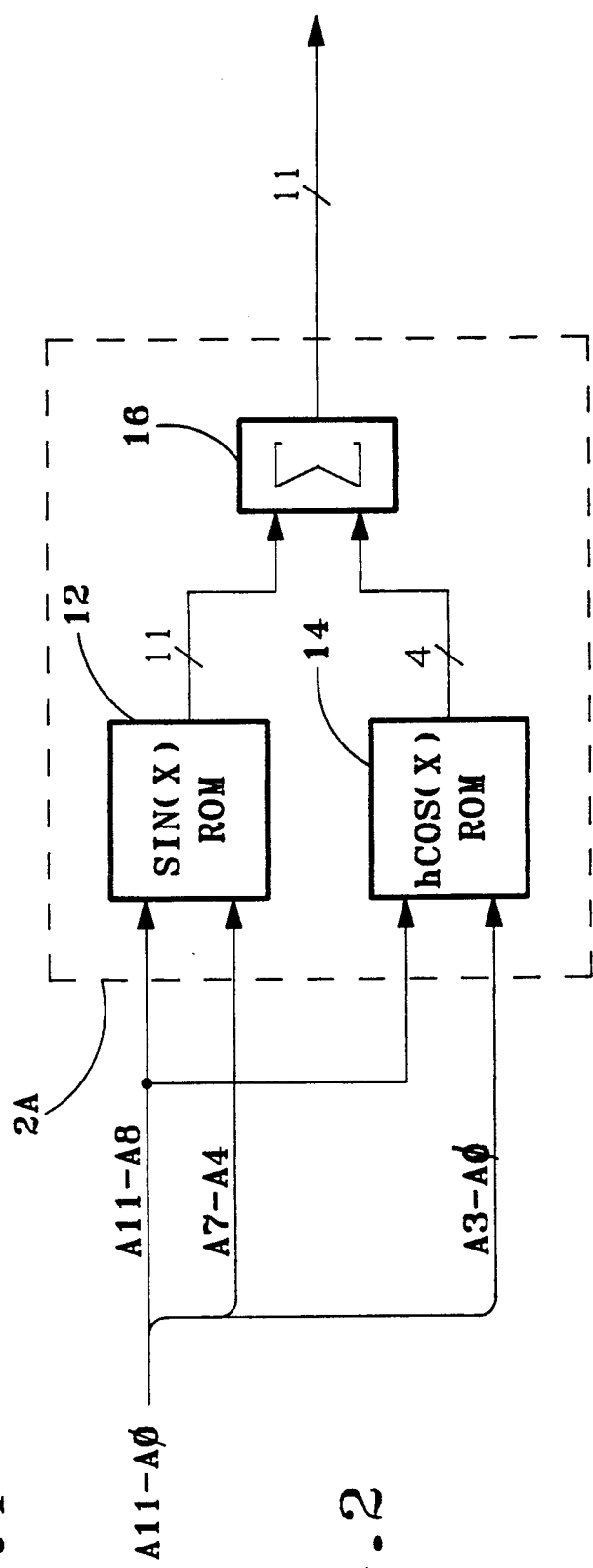
FIG. 1
FIG. 2

SOURCE OF QUANTIZED SAMPLES FOR SYNTHESIZING SINE WAVES

This is a continuation of application Ser. No. 07/672,363, filed Mar. 20, 1991 now abandoned.

BACKGROUND OF THE INVENTION

This invention relates in general to devices and processes for reducing the amount of quantized data required to faithfully reproduce a sinusoidal signal over a range of frequencies, and in particular to such devices and processes in a direct-digital frequency synthesizer which uses quantized samples of the signal produced from summations of values stored in multiple sample memories.

The process used in conventional direct-digital frequency synthesizers is to communicate the output (phase) of a clocked, variable-increment, phase accumulator to a memory wherein quantized samples of the function being synthesized are mapped, i.e. stored in order of recall. The digital data from the memory is converted to corresponding analog signals which are then suitably filtered to remove high frequencies components inherently introduced by the process. Such a process is a general process for producing a wide variety of functions, e.g., sine, sawtooth, square wave, etc. Also, if the function being produced has symmetry, it is common to take advantage of the symmetry by mapping into the memory only that portion of the function which repeats itself for the purpose of reducing the amount of memory needed. For example, only a quadrant of a sine function, that is, 90 degrees, need be mapped because the other quadrants can be generated by simple digital manipulation. This process saves about 75% of the memory otherwise required.

This invention has the very significant advantage of allowing a further reduction in the amount of memory required for phase to sine wave conversion/transformation; the reduction can be by over 90% of the memory otherwise required. For example, in order to conventionally map magnitude samples of a sine function singularly corresponding to the phase outputs of a fourteen-bit phase accumulator (M=14) into a sample memory having a twelve-bit resolution output (K=12), one needs $2^M \times K$ bits of memory, which calculates to 196,608 bits, i.e. 16,384 quantized samples stored each as a twelve-bit binary number. For low and moderate speed operations, such large memories with suitable access times are available, but they are not currently available for high speed operations, e.g., over 50 Mhz. This invention can accomplish the same task, i.e., produce up to $2^{12}$ twelve-bit quantized samples, but only requires about 3152 bits of sample memory (in the preferred embodiment as discussed herein), a memory size that can be currently achieved for such high speed applications.

Heretofore, no direct-digital synthesizing device or process has been presented which takes advantage of characteristics of a sine wave as does this invention. This invention goes further and takes advantage of the smooth, monotonic, convex (albeit non-linear) properties of the sine wave. It uses piece-wise linear extrapolation and manipulation possible because of certain mathematical properties as will be explained.

A further advantage of this invention lies in the fact that the sample memories need not output data words wider than eight binary bits. From the standpoint of manufacturing integrated devices, this is very advantageous.

Other advantages and attributes of this invention will be readily discernible upon a reading of the text herein.

SUMMARY OF THE INVENTION

An object of this invention is to provide a source of quantized samples for synthesizing sine waves which requires significantly less stored data than conventional such sources.

A further object of this invention is to provide a reduction in the amount of stored data required to provide quantized samples for synthesizing sine waves by storing samples of an auxiliary function and by storing samples of a sine function less the auxiliary function so that during synthesis the samples of both stored expressions can be summed to produce convergent samples of the sine function.

A further object of this invention is to reduce the dynamic range of the memory in which the quantized samples of a sine function must be stored for a synthesis.

These objects and others are accomplished by a device for converting numerical phase information into composite quantize samples of a sine function over a portion of the sine function period in either or both embodiments disclosed herein. The first embodiment comprises: (a) means for providing a convergent sample in response to each selected one of a plurality of phases of convergence, the selectable phases of convergence being uniformly distributed over said portion of the sine function period, each convergent sample so provided comprising a quantized sample of the sine function at its respective phase of convergence, (b) means for providing a quantized addend in response to each combination of a selected one of a plurality of phase sectors and a selected addend index number, the selectable phase sectors being uniformly distributed over said portion of the sine function period and there being a uniform plurality of phases of convergence in each phase sector, each provided non-zero quantized addend when summed with a concurrently provided convergent sample producing an extrapolated sample of the sine function at a concurrently selected phase, (c) means for providing a selected addend index number which comprises the difference between a numerical representation of a selected phase and a numerical representation of a concurrently selected phase of convergence, and (d) means for summing each provided convergent sample with each concurrently provided addend, the sum being a composite quantized sample. The second embodiment comprises: (a) means for providing a quantized sample of an auxiliary function in response to each selected one of a plurality of phase sectors, the selectable phase sectors being uniformly distributed over said portion of the sine function period, (b) means for providing a quantized sample of the sine function less the auxiliary function in response to each selected one of a plurality of phases of convergence, selectable phases of convergence being uniformly distributed over said portion of the sine function period and there being a uniform plurality of phases of convergence in each phase sector, the magnitude of the sine function less the auxiliary function being within the dynamic range of said means for providing a quantized sample of the sine function less the auxiliary function at least within the said portion of the sine function, (c) means for providing a quantized addend in response to each combination of a selected phase sector and a selected index number, each provided non-zero quantized addend when summed with a concurrently provided auxiliary function sample and a concurrently provided sine function less auxiliary function sample producing an extrapolated sample of the sine function at a selected phase, (d) means for providing a selected addend index number which comprises the difference between a numerical representation of a selected phase and a numerical representation of a concurrently selected phase of convergence, and (e) means for summing each concurrently provided quantized sample of the auxiliary function, quantized sample of the sine function less the auxiliary function, and quantized addend, the sum being a composite quantized sample.

BRIEF DESCRIPTION OF THE DRAWINGS

FIG. 1 is an overall functional block diagram of an embodiment of this invention wherein M=14 and K=12.

FIG. 2 is a functional block diagram of a first embodiment of a sample source according to this invention wherein M=14 and K=12.

DESCRIPTION OF THE PREFERRED EMBODIMENT

Figure 3:
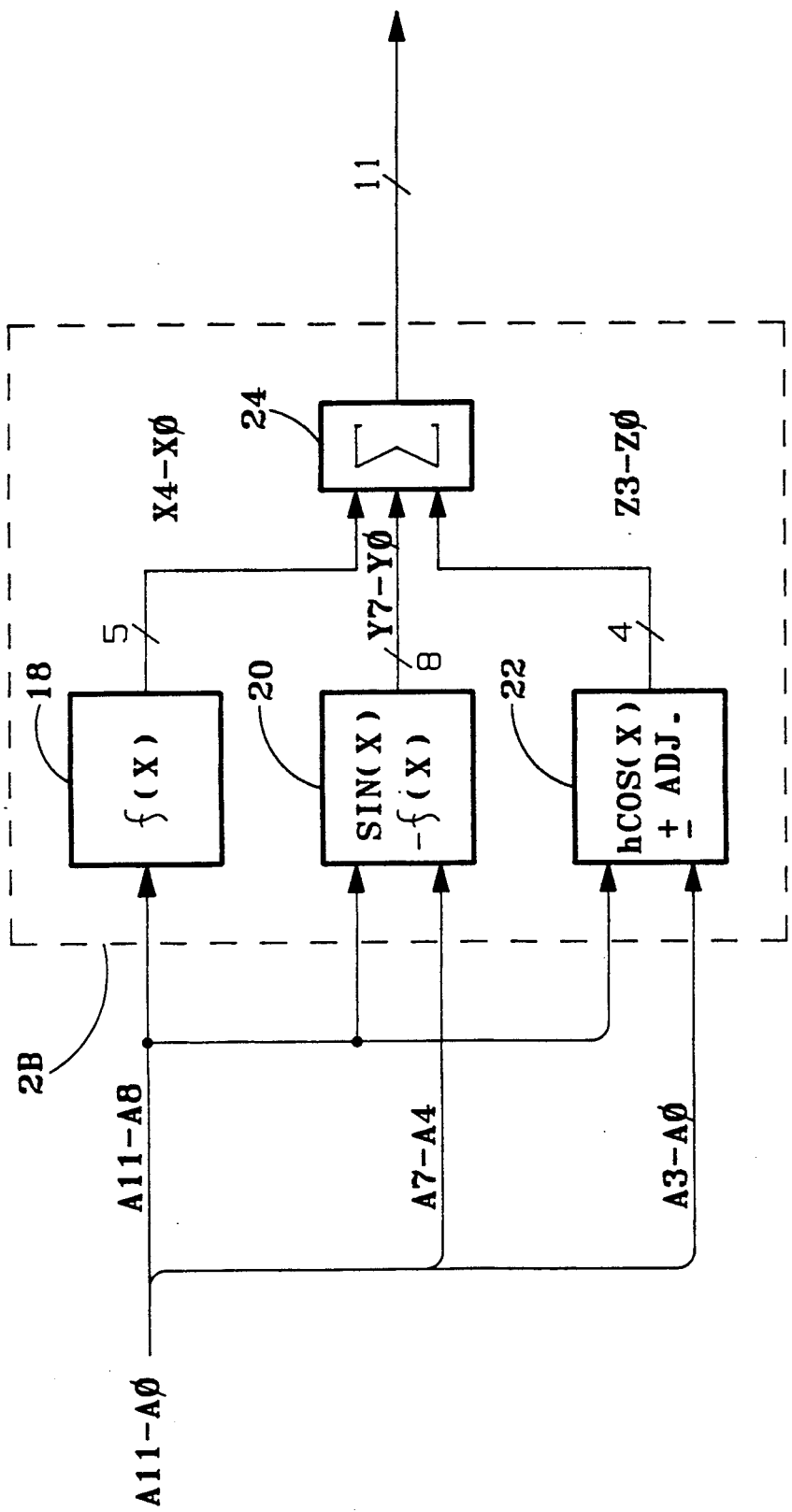
FIG. 3 is a functional block diagram of a second embodiment of a sample source according to this invention wherein M=14 and K=12.

For a "perfect" reproduction of a sine function by direct digital synthesis the sine function should be quantized into samples at uniformly spaced phases, each sample being accurate to within $\pm \frac{1}{2}$ least significant bit (LSB) which is $\pm \frac{1}{2}^{K+1}$ for a binary data word having "K" bits of resolution, and all the samples must be mapped into an addressable memory for recall during the synthesis. The samples are mapped by storing them in the memory in an ordered fashion such that each sample is recalled when the address being applied to the memory corresponds to the phase of the sample. Conventional calculation of the quantized samples of a sine function to be mapped into a memory having, for example, $2^M$ individually addressable memory cells, each cell capable of storing a binary sample "K" bits wide, is according to the formula:

$$S(n) = 2^{K-1} + Int\left[(2^{K-1} - 1) \times \sin\left(\frac{2\pi n}{2^M}\right)\right]$$

for $n = 0$ to $(2^M - 1)$

The expression "Int[. . . ]" signifies the integer value of a term between the brackets. The calculations produce an integer set, S(n), of quantized samples ($2^M$ in number) which are uniformly spaced, phase-wise, $2\pi/2^M$ radians apart.

Mapping for a perfect reproduction of a sine function where M=14 and K=12 is conventionally as follows:

$$S(n) = 2048 + Int\left[2047 \times \sin\left(\frac{2\pi n}{16384}\right)\right]$$

for $n = 0$ to $16383$

From these calculations it can be seen that for a perfect reproduction of a sine wave where M=14 and K=12 at least 196,608 bits ($2^M \times K$) of memory are required.

However, a sine function has certain properties which can be exploited to reduce the amount of digital memory required to faithfully reproduce it, e.g., to within $\pm 1$ LSB of theoretical. It has symmetry such that only quantized samples for a single quadrant need be stored because the same samples can be used for producing the other quadrants. This is conventionally done by signing the samples and selectively toggling the sign, e.g., by complementing the recalled quantized samples, and by selectively reversing the order in which the samples are recalled from memory. Moreover, the sine wave is smooth, monotonic and convex (albeit non-linear), and the sine function and its derivatives of all orders exist at all points. Therefore, the Taylor Series, which is a convergent power series generally useful as a representation of a function near a point "a" if the function and its derivatives of all orders exist at said point, can be used to great advantage as a means for producing extrapolation samples of the sine function between a plurality of selected points on the sine wave, e.g., within the first quadrant.

The Taylor Series infinite expansion for a function f(x) near a point "a" is as follows:

$$f(x) = f(a) + (x - a)f'(a) + \frac{(x - a)^2}{2!} f''(a) + \ldots +$$

$$\frac{(x - a)^k}{k!} f^{(k)}(a) + \ldots$$

Another form of the Taylor Series expansion for a function f(x) near a point "a" where h=(x−a) is commonly called the increment form, and is as follows:

$$f(x + h) = f(x) + hf'(x) + \left(\frac{h^2}{2!}\right)f''(x) + \frac{h^3}{3!} f'''(x) +$$

$$\ldots + \left(\frac{h^k}{k!}\right)f^{(k)}(x) + \ldots$$

For a sine function, sin(x), the increment form of the Taylor Series expansion is as follows:

$$\sin(x + h) = \sin(x) + h\cos(x) - \frac{h^2}{2!} \sin(x) + \ldots$$

Thus it can be seen that a sine function near any point "a" can be approximated by the algebraic addition of a number of Taylor Series expansion terms, the faithfulness of the approximation depending on the number of terms included in the summation.

It has been found that in practice only the first two terms of the Taylor Series expansion need be considered. To understand the significance of the contribution of the third and following expansion terms of the Taylor Series to an approximated sample's magnitude consider an example. Assume that a period of the sine function is to be synthesized from 256 accurate samples of the function at phases ("phases of convergence") uniformly spaced over the period in phase increments "h", which in this case equals $2\pi/256$ radians, and from some number of approximated samples at phases in the phase gaps between the phases of convergence, the approximated samples in each gap to be derived from a Taylor Series expansion about one of the two phases of convergence demarking the gap. (This is equivalent to digitally memory-mapping a sine wave where $M=8$, that is, the memory has eight address bits and therefore $2^8$ or 256 storage locations, one for each phase of convergence.) Since the maximum magnitude of any quantized sample of the sine function $\sin(x)$ is $1.000\ldots$, the maximum contribution of the third term to the magnitude of a given quantized sample of the sine function can be found as follows:

$$\left(\frac{h^2}{2!}\right)\sin(x) < \frac{h^2}{2!} = \frac{\left(\frac{2\pi}{256}\right)^2}{2!} \approx 3 \times 10^{-4}$$

If the magnitudes of the quantized samples are in the form of twelve-bit binary numbers, i.e. $K=12$, then the relative contribution of the third Taylor Series term (approx. $3 \times 10^{-4}$) to the magnitude of a given sample is very nearly equal to the relative weight of an LSB of a twelve-bit binary number ($\frac{1}{2}^{12}$ or $2.44 \times 10^{-4}$). It can likewise be shown that the contributions of the terms beyond the third term are cumulatively negligible. Thus, a Taylor Series representation of a sine function between phases of convergence using only eight bits of mapping (and this invention can be used for much larger mapping) and using only the first two terms of the expansion can nevertheless have a resolution very nearly equal to $\pm 1$ LSB of a twelve-bit representation, the first two expansion terms being as follows:

$$\sin(x + h) \approx \sin(x) + h\cos(x)$$

$$\text{where } h \leq \frac{\pi}{128}$$

It should be noted that the maximum contribution of the third term would also be the maximum extrapolation error between the theoretical and a digital representation if only the first three terms of the Taylor series were used.

Since the sine function is periodic, the entire function can be represented by representing one period, in this case $2\pi$ radians. Responsive to phase information, this invention provides selectable series of quantized samples for reproducing a sine function, one sample being provided for each phase. The selection of a sample series depends on the phases being applied to this invention (which typically depends on the phase increment applied to a phase accumulator). Samples that converge on the sine function ("convergent samples") are available at a number of uniformly spaced phases ("phases of convergence") a selected quadrant of the sine function (e.g., from $0-\pi/2$). In synthesis, during each phase gap between a given selected phase of convergence (selected by the concurrently applied phase) and the next following selected phase of convergence, a memory of this invention provides a convergent sample having a magnitude substantially equal to the magnitude of the sine function at said given selected phase of convergence. At phases intermediate the phases of convergence this invention can provide sets of numerical values ("extrapolation values") which when serially summed with the provided convergent samples produce extrapolations ("extrapolation samples") of the sine function. Selected convergent samples and extrapolated samples intermediate therebetween are used to synthesize the selected quadrant and certain techniques according to this invention, as will be explained, produce a full period of the sine function from the synthesized quadrant.

In a first embodiment, the sets of extrapolation values which are used to produce the extrapolated samples are derived from the second terms of Taylor Series expansions of the sine function about points at a plurality of phases ("sector boundary phases"). The sector boundary phases are uniformly spaced phase-wise across the selected quadrant and conceptually divide the quadrant into a plurality of sectors of uniform angular dimension. For each sector there is a uniquely associated set of extrapolation values. Each extrapolation value set can define a straight line, i.e., a ramp having a slope equal to the value of the second term of a Taylor Series expansion about a point on the sine wave at the sector boundary phase that defines the leading boundary of the set's associated sector (the set's "parent sector boundary phase"). The straight line defined by the members of any given extrapolation value set is an approximation of the form of the sine wave within the set's associated sector, the sector leadingly defined by the set's parent sector boundary phase. (The terms "lead", "leading", and "leadingly" as used herein refer to the order in which phases are applied to the sample memories during synthesis, whether progressively or retrogressively; e.g., a first phase can be said to lead a second phase if the first phase is applied to the memories before the second phase.) Because of the smooth, monotonic form of a sine function, considerably fewer sector boundary phases are needed than phases of convergence. The sector boundary phases and the phases of convergence are selected so that during synthesis this invention can provide an integer number of convergent samples within each sector. The extrapolation value set associated with a given sector can produce linearly extrapolated samples in phase gaps between phases of convergence lying within the sector.

In the preferred embodiment, the convergent samples are produced by a summation process as will be explained. Again, each sector has a uniquely associated extrapolation value set which can define a ramp, but the slope of the ramp defined by the extrapolation value set is adjusted as necessary to make the extrapolated samples in the sector more accurately fit the form of the sine wave within that sector. This is done to correct for quantization errors introduced by the process of producing the convergent samples. Again, the selected quadrant is conceptually phase divided into a plurality of uniform "sectors" demarked by a plurality of sector boundary phases, and each sector is uniformly subdivided into a plurality of "phase gaps" demarked by the phases of convergence lying within the sector. Within each sector the sine function can be represented by a series of convergent samples (at selected phases of convergence nested within the sector), and by a series of extrapolated samples at phases intermediate the selected phases of convergence. The extrapolated samples are produced by orderly adding to the concurrently selected convergent sample a series of extrapolation values from the extrapolation value set associated with the sector in which the phase gap lies.

Referring to FIG. 1, an embodiment of this invention in which M=14 and K=12 is illustrated. An addressable, eleven-bit sample source 2 contains 256 eleven-bit samples of a first quadrant of a sine function. A clocked phase accumulator 4 provides incrementing phase information in the form of addresses to a resolution of at least fourteen bits, A13 through A0, A13 being the most significant bit (MSB) of the address and A0 being the least significant bit (LSB). Except for the two most significant bits, A13 and A12, the output of the phase accumulator, bits A11–A0, is communicated in order of significance to the input of a first logical complementor (ones) 6 which complements or passes through uncomplemented said bits to its output depending upon the logical state of the second most significant bit, A12, from the accumulator. If A12 is true then bits A11 through A0 are logically complemented before they are communicated to the sample source 2, but if A12 is false then said bits are not complemented before they are so communicated. The data word output from the sample source 2 (11 binary bits) is communicated to a second logical complementor (ones) 8 which complements or passes through uncomplemented said sample source output depending upon the logical state of the most significant bit, A13, from the accumulator. If A13 is logically true then the data is complemented before it is communicated to a DAC (digital to analog converter, not shown), but if A13 is false then said data is not complemented before the data is so communicated. A13 is also complemented by a logical invertor 10 and communicated to the DAC as the sign bit for the sample word being concurrently communicated to the DAC from the second complementor 8.

FIG. 1 illustrates the first complementor to be an exclusive "or" circuit which logically inverts A11–A0 when A12 is true and which does not so invert when A12 is false. The second complementor is illustrated to be an exclusive "or" circuit which logically inverts the sample source data word when A13 is true and which does not so invert when A13 is false.

Referring to FIG. 2, a first embodiment is illustrated as having a sample source 2A which comprises a first memory 12 and a second memory 14 the data outputs of which (eleven and four bits, respectively) are added by a summing circuit 16. The summing circuit 16 is functionally an eleven-bit adder receiving two eleven-bit addends and producing an eleven-bit sum of the two addends. The output of the first memory is a first addend. The four-bit output of the second memory is presented to the summing circuit as the four least significant bits of a second eleven-bit addend with the seven most significant bits being at all times logically false. The data mapped into the first memory 12 and the second memory 14 are calculated according to the equations for $C_1(n)$ and $C_2(m,k)$, respectively, below:

$$C_1(n) = 2048 + Int\left[2047 \times \sin\left(\frac{n\pi}{512}\right)\right]$$

for $n = 0$ to $255$ $$C_2(m,k) = Int\left[k \times \cos\left(\frac{m\pi}{32}\right)\right]$$

for: $m = 0$ to $15$, $k = 0$ to $15$ $C_1(n)$ calculates 256 convergent samples of the sine function at phases of convergence uniformly distributed over the first quadrant in phase steps of $\pi/512$. The convergent samples are precise to twelve binary bits. $C_2(m,k)$ picks sixteen sector boundary phases which leadingly define sixteen uniform sectors distributed over the first quadrant in phase steps of $\pi/32$ and calculates the value of the second term of their respective Taylor Series expansions. For each such second term $C_2(m,k)$ creates a sixteen member set comprising a linear series of numerical values, that are to be used as extrapolation addends, by multiplying the second term value by the series of integers from 0 through 15. Thus $C_2(m,k)$ comprises sixteen sets of extrapolation values, each set comprising a sixteen member linear series of addends, each set being uniquely associated with the sector leadingly defined by its parent sector boundary phase.

In effect $C_2(m,k)$ finds the slope of the sine function at each of the sixteen sector boundary phases and, for each sector boundary phase, it develops a series of values which if plotted on a graph would define a straight line having the slope of the sine function found at the parent sector boundary phase. In operation during synthesis, the straight line associated with a sector is synthesized in some or all the phase gaps that are nested within the sector. Each such synthesized line has an origin at a phase of convergence in the sector and each point on the synthesized line has a magnitude equal to the sum of the magnitude of the sample at the originating phase of convergence, and the magnitude of a corresponding extrapolation addend. If all sixteen members of a set of extrapolation addends are selected then the line will be defined by extrapolated samples in phase steps of $\pi/8192$, the selection depending on the selected phase accumulator increment.

As illustrated in FIG. 2, the first embodiment has a first memory 12 that can provide up to 256 eleven-bit convergent samples corresponding to the magnitude of the sine function at the respective phases of convergence, i.e., at phases uniformly spaced by $\pi/512$ radians from 0 to $255\pi/512$ radians, in response to selected phases of convergence. The phases of convergence are selected by the eight most significant address bits, A11–A4, which are applied to the first memory. The four most significant address bits, A11–A8, determine the sector of the quadrant concurrently being synthesized, and said address bits are applied to the second memory to select the sector's associated extrapolation value set. Within the selected sector the second memory 14 can repeatedly provide the straight line series of four-bit algebraic addends calculated by $C_2(m,k)$ with respect to the sector's leading boundary phase. Each provided straight line series can comprise up to sixteen member addends corresponding to phases uniformly spaced by $\pi/8192$ radians originating at a phase of convergence within the sector. A particular member of a selected extrapolation value set is selected by the four least significant address bits, A3–A0, which function as an index signifying which addend of which set the second memory is to provide.

During synthesis, the extrapolation values are individually selected by a combination of the selected sector and an index number, one value per combination.

The index number at any phase selected by the phase accumulator is the difference between the numerical representation of the selected phase and the numerical representation of the concurrently selected phase of convergence. In the embodiments disclosed herein the index number equals the difference between all twelve address bits, A11–A0, (the address bits containing the numerical representation of all selected phases) and the most significant eight bits of the address, A11–A4, (the address bits containing the numerical representation of all selected phases of convergence), the difference being a number represented by the four least significant address bits, A3–A0, i.e. the index number.

Thus at the output of adder 16 during synthesis is seen a series of convergent samples distributed over a quadrant spaced $\pi/512$ radians or greater apart, and within the phase gaps between convergent samples up to fifteen linearly extrapolated samples distributed over the gap in steps of $\pi/8192$ radians or greater, said linearly extrapolated samples comprising the sum of the convergent sample defining the beginning of a phase gap and the straight line series of addends calculated by $C_2(m,k)$ for the sector in which the phase gap lies. The total memory required for this embodiment is $256 \times 15 = 3840$ binary bits, but it requires a memory capable of storing eleven-bit words. Such memories are not readily available nor easily manufactured, because of special layout requirements.

Figures 4, 5:
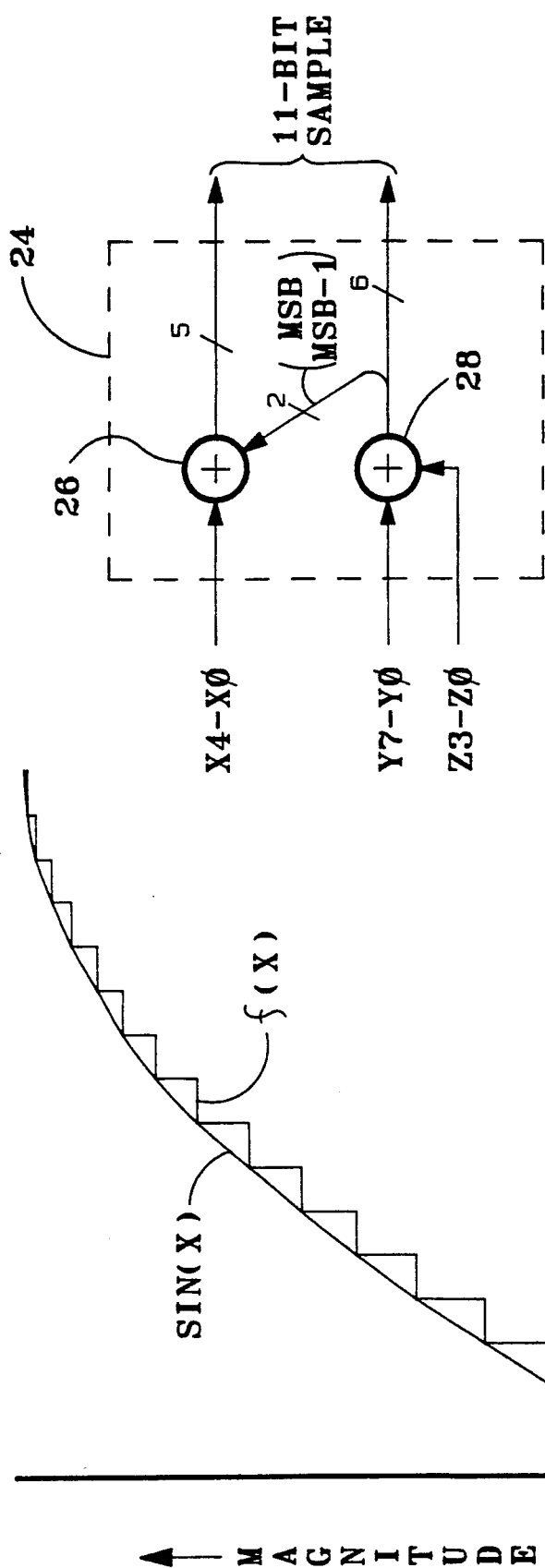
FIG. 4 is a more detailed functional block diagram of an embodiment of the summing function illustrated in FIG. 3.
FIG. 5 is a graph (magnitude vs. phase) of the first quadrant of a sine wave illustrating therewith one of many possible auxiliary functions for use in the sample source of FIG. 3.

FIGS. 3 and 5 illustrate a major advantage of this invention over the data compression techniques discussed above with reference to FIG. 2 in an application where use of an eleven-bit memory has significant disadvantages, which is normally the case. Rather than mapping the sine function, $\sin(x)$, in a memory, this embodiment uses an auxiliary "coarse" function, $f(x)$, one that approximates $\sin(x)$ at only a few selected points. Generally, the auxiliary function is mapped in a first memory and the sine function less the auxiliary function, $\sin(x)-f(x)$, is mapped in a second memory, and then the sine function is re-created by summing the outputs of the two memories along with the output of a third memory containing error correction and extrapolation addends. In doing so the dynamic range of the memory used to produce convergent samples of the sine function is greatly reduced, since the dynamic range of $\sin(x)-f(x)$ is considerably less than the dynamic range of $\sin(x)$. It can be shown that the dynamic range of all components is reduced substantially, and only eight bits of memory output need be used as compared to the eleven bits of memory output necessary as illustrated in FIG. 2. Also the total memory size is reduced. Compare the total memory size of the sample source illustrated in FIG. 2 which is 3840 ($256 \times 15$) to the total memory size as illustrated in FIG. 3 which is 3152 ($[256 \times 12]+[16 \times 5]$). This is a reduction of almost twenty percent.

Referring to FIG. 3, a sample source 2B is illustrated as comprising a first memory 18, a second memory 20, and third memory 22. Applied to the address inputs of the first memory are the four most significant address bits, A11–A8, which again serve to select the concurrent sector. Applied to the address inputs of the second memory are the eight most significant address bits, A11–A4, which again serve to select the concurrent phase of convergence. Applied to the address inputs to the third memory are the four most significant address bits, A11–A8, which again serve to select the extrapolation value set associated with the selected sector, and the four least significant address bits, A3–A0, as an index to select a particular member addend of the extrapolation value set associated with the selected sector. The first memory can be a $16 \times 5$ read-only memory (ROM), the second memory can be a $256 \times 8$ ROM and the third memory can be a $256 \times 4$ ROM. The outputs of the memories are summed together by summing circuit 24 which is further illustrated in FIG. 4 as comprising functionally a five-bit adder 26 in tandem with eight-bit adder 28. The five-bit output of the first memory, X4–X0, is applied as a first addend to the five-bit adder 26. The two most significant bits from the output of the eight-bit adder 28 are applied in order of significance to the two least significant bits of the second addend of the five-bit adder 26, the three most significant bits of said addend being held at a logical false. The output of the five-bit adder is used in order of significance as the five most significant bits of the sample source's quantized sample.

Referring again to FIGS. 3 and 4, the eight-bit output of the second memory is applied as a first addend to the eight-bit adder 28. The second addend input of the eight-bit adder receives its four least significant bits from the four-bit output of the third memory. The four most significant bits of this second addend are held at a logical false. The least significant six bits of the output of the eight-bit adder are used in order of significance as the least significant six bits of the quantized sample. Thus, the quantized sample receives its five most significant bits from the output of the five-bit adder 26 and its six least significant bits from the output of the eight-bit adder 28.

The data mapped into the first memory 18 comprises quantized samples (to a resolution of eleven-bits truncated from the least significant end to five-bits) of a selected auxiliary function which closely approximates or follows the sine function in the selected quadrant. The auxiliary function ($f(x)$) is chosen so that the magnitude of the quantized error between it and the sine function at any phase in the quadrant is less than the dynamic range of the second memory 20. Choosing the auxiliary function with this criteria, insures that the magnitude of $\sin(x)-f(x)$ is never greater than 255, in this embodiment, and can therefore be fully represented by samples in a memory having only an eight-bit output word.

Referring again to FIGS. 3 and 4, the second memory 20 contains 256 eight-bit samples of the sine function less the auxiliary function at phases of convergence uniformly spaced over the selected quadrant. The quantized samples of the auxiliary function stored in the first memory comprise sixteen samples at sector boundary phases uniformly distributed over the first quadrant. The summing circuit 24 effectively adds the outputs of the first and second memories to produce 256 convergent samples. However, because the samples of the auxiliary function are truncated to five-bits and the number of available $f(x)$ samples is considerably less than the number of available $\sin(x)-f(x)$ samples, quantization errors are introduced. It has been found that these errors can be corrected to be within the tolerance of $\pm 1$ LSB by artful selection of the extrapolation addends mapped into the third memory, thus permitting these memory saving measures.

As illustrated in FIGS. 3 and 5, the sixteen samples at sector boundary phases of the auxiliary function mapped into the first memory can comprise sixteen uniformly phase-spaced phases of convergence on the sine function truncated to five-bits. Thus, the samples mapped in the first memory define a stair-step function roughly following the sine function through the selected quadrant, the points on the stair-step function never being greater than ±1 LSB of twelve-bit resolution distant from the sine wave. It should be noted that this is but one example of an auxiliary function that can be selected. The auxiliary function is chosen to reduce the dynamic range of the memory needed to produce the convergent samples. There are probably many different sets of samples which can be stored in the first memory and which define different auxiliary functions. The primary criteria is that the auxiliary function must be such that any error between it and the sine function has a magnitude never greater than that which can be expressed within the desired word size of the second memory.

Although it has been found that the quantization errors introduced by truncating the f(x) samples and limiting their number to considerably less than the number of sin(x)-f(x) samples (16 vs. 256) can be brought to within desirable limits by artful selection of the extrapolation sets, slopes, the auxiliary function need not be so truncated, or can be less truncated. In either case there will still be a reduction in memory over the first embodiment. For example, if the f(x) samples were not truncated and were eleven bits, there would still be a memory reduction of about 15%. Also the number of five-bit f(x) samples could be multiplied up to a point and still achieve a reduction in memory.

The third memory 22 contains sixteen sets of addends. Each set can comprise sixteen four-bit addends which define a ramp function, i.e., a straight line having a selected slope. Thus each set can be said to have a slope associated with it, the slope of the ramp defined by its members. The sets are singularly associated with the auxiliary function values stored in the first memory. When a sample of the auxiliary function is selected in the first memory by address bits A11–A8, the ramp set associated with that auxiliary function sample is also selected in the third memory. The slope of each set is artfully chosen to minimize quantization errors over the quadrant sector of the set's associated auxiliary function sample. A preferred way of determining the optimal slopes, optimal with respect to minimizing quantization errors, is to find the second term of the Taylor Series expansion about points at each of the sixteen sector boundary phases defined by A11–A8. This in effect finds the slope of the sine function at those phases. The slopes found in this fashion are then adjusted, for example by trial and error with the aid of computer simulations, to find the optimal slopes. Then from each of these slopes, a sixteen member ramp function (an extrapolation value set) is generated by multiplying each slope by the integers from zero through fifteen.

The method of generating the values to be stored in the memories of the sample source embodiment illustrated in FIG. 3 can be expressed as follows:

$$C_1(n) = Int\left[\frac{2048 + Int\left[2047 \times \sin\left(\frac{n\pi}{32}\right)\right]}{64}\right] \times 64$$

for $n = 0$ to 15

-continued $$C_2(n) = \left(2048 + Int\left[2047 \times \sin\left(\frac{n\pi}{512}\right)\right]\right) - C_1(n)$$

for $n = 0$ to 255

$$C_3(m,k) = Int\left[k \times \left(\cos\left(\frac{m\pi}{32}\right) + Adjustment_m\right)\right]$$

for: $m = 0$ to 15, $k = 0$ to 15

It should be noted that $C_1(n)$ is truncated to five bits from its least significant end, and therefore its LSB has a weight of sixty four.

It has been found by methods discussed above that certain selected slopes produce quantized samples within ±1 LSB, and therefore the equation for the values stored in the third memory can be as follows:

$$C_3(k) = Int\left[k \times \frac{1}{16} \{13.4, 13.2, 13.2, 12.5, 11.7, 10.8, 10.2,\right.$$

$$\left. 9.3, 8.5, 7.3, 6.1, 5.1, 3.9, 2.6, 2.1\}\right]$$

for $k = 0$ to 15

For, example, the value 13.4 in the $C_3(k)$ expression above is he preferred un-normalized slope of the ramp function associated with the first sector of the first quadrant. This closely approximates the value of the second term of the Taylor Series expansion about the sector boundary phase leading the sector, but is adjusted, e.g., by trial and error, to minimize quantization errors within the sector.

Although the extrapolation values discussed herein were illustrated as linear sets, it should be noted that they need not be. It has been found that linear sets derived as explained above are effective to bring quantization errors within desirable limits, but non-linear sets can be chosen, e.g., by the use of computer simulations, which could be so effective.

Although the memory devices discussed above and illustrated in the drawings for storing the samples were said to be ROMs, any addressable memory means, including volatile memory, can be used without departing from the purposes and scope of this invention. If volatile memory is used then the samples can be pre-stored (before initiating synthesis) in said memory by conventional means for obtaining the sample data from another source, e.g. magnetic storage media, and writing the data into said memory.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A device for converting quantized phase information into corresponding convergent and extrapolated quantization samples of a sine function over a portion of the sine function period, the device comprising:
   (a) means, for each phase, for separating from the phase information a first portion for selecting a corresponding phase of convergence, a finite number of selectable phases of convergence being uniformly distributed over said portion of the sine function period,
(b) means, for each phase, for separating from the phase information a second portion for selecting a corresponding phase sector, a finite number of selectable phase sectors uniformly partitioning said portion of the sine function period, there being a uniform plurality of phases of convergence uniformly distributed in each phase sector,
(c) means, for each phase, for separating from the phase information an index number,
(d) a first memory responsive to each state of said first portion for providing a corresponding convergent sample, each convergent sample so provided comprising a quantized sample of the sine function at the corresponding phase of convergence,
(e) a second memory responsive to combinations of said second portion and index numbers for providing corresponding quantized extrapolation addends, one for each combination, and
(f) means for summing each provided convergent sample with each concurrently provided extrapolation added to produce a quantization sample of the sine function, said quantization sample being a convergent sample if the extrapolation addend is zero, said quantization sample being an extrapolated sample if the extrapolation addend is non-zero.

2. The device according to claim 1 wherein the second memory has prestored therein sets of extrapolation addends, each set uniquely corresponding to a phase sector and comprising a series of quantized values defining a ramp having a slope approximating the slope of the sine function within the set's corresponding phase sector.

3. The device according to claim 2 wherein each set of extrapolation addends comprises a finite series of values equal to the second term of the Taylor Series expansion about a point on the sine function at a sector boundary phase leadingly defining the set's corresponding sector multiplied by an arithmetically progressive series of integers beginning with zero.

4. The device according to claim 1 wherein the quantized phase information comprises "X" weighted binary bits, and wherein the means for separating from the phase information a first portion comprises a plurality "A" of most significant bits of the quantized phase information communicating in order of significance to an input of the second memory; and wherein the means for separating from the phase information a second portion comprises the bits A combined in order of significance with a plurality "B" of lesser significant bits of the quantized phase information communicating in order of significance to an input of the first memory; and wherein the means for separating from the phase information an index number comprises the bits X-A-B of the quantized phase information communicating in order of significance with the input of the second memory.

5. The device according to claim 4 wherein the second memory has prestored therein sets of extrapolation addends, each set uniquely corresponding to a phase sector and comprising a series of quantized values defining a ramp having a slope approximating the slope of the sine function within the set's corresponding phase sector.

6. The device according to claim 5 wherein each set of extrapolation addends comprises a finite series of values equal to the second term of the Term Series expansion about a point on the sine function at a sector boundary phase leadingly defining the set's corresponding sector multiplied by an arithmetically progressive series of integers beginning with zero.

7. A device for converting quantized phase information into corresponding convergent and extrapolated quantization samples of a sine function over a portion of the sine function period, the device comprising:
(a) means, for each phase, for separating from the phase information a first portion for selecting a corresponding phase of convergence, a finite number of selectable phases of convergence being uniformly distributed over said portion of the sine function period,
(b) means, for each phase, for separating from the phase information a second portion for selecting a corresponding phase sector, a finite number of selectable phase sectors uniformly partitioning said portion of the sine function period, there being a uniform plurality of phases of convergence uniformly distributed in each phase sector,
(c) means, for each phase, for separating from the phase information an index number,
(d) a first memory responsive to each state of said second portion for providing one each corresponding quantized samples of an auxiliary function,
(e) a second memory responsive to each state of said first portion for providing a corresponding quantized sample of the sine function less the auxiliary function, the magnitude of said quantized sample being within said second memory's dynamic range at least within said portion of the sine function period,
(f) a third memory responsive to combinations of said second portion and index numbers for providing corresponding quantized extrapolation addends, one for each combination, and
(g) means for summing each concurrently provided quantized sample of the auxiliary function, quantized sample of the sine function less the auxiliary function, and quantized extrapolation addend to produce a quantization sample of the sine function, said quantization sample being a convergent sample of the extrapolation addend is zero, said quantization sample being an extrapolated sample if the extrapolation addend is non-zero.

8. The device according to claim 7 wherein the third memory has prestored therein sets of extrapolation addends, each set uniquely corresponding to a phase sector and comprising a series of quantized values defining a ramp having a slope approximating the slope of the sine function within the set's corresponding phase sector.

9. The device according to claim 8 wherein the slopes of the ramps defined by the sets of addends are selected to compensate for quantization errors.

10. The device according to claim 8 wherein each set of extrapolation addends comprises a finite series of values equal to the second term of the Taylor Series expansion about a point on the sine function at a sector boundary phase leadingly defining the set's corresponding sector multiplied by an arithmetically progressive series of integers beginning with zero.

11. The device according to claim 10 wherein the slopes of the ramps defined by the sets of addends are selected to compensate for quantization errors.

12. The device according to claim 7 wherein the auxiliary function samples are truncated from a least significant end and the quantized addends are selected to reduce quantization errors introduced by the truncation to selected limits.

13. The device according to claim 7 wherein the quantized phase information comprises "X" weighted binary bits, and wherein the means for separating from the phase information a first portion comprises a plurality "A" of most significant bits of the quantized phase information communicating in order of significance to both an input of the third memory and an input of the first memory; and wherein the means for separating from the phase information a second portion comprises the bits A combined in order of significance with a plurality "B" of lesser significant bits of the quantized phase information communicating in order of significance to an input of the second memory; and wherein the means for separating from the phase information an index number comprises the bits X-A-B of the quantized phase information communicating in order of significance with the input of the third memory.

14. The device according to claim 13 wherein the third memory has prestored therein sets of extrapolation addends, each set uniquely corresponding to a phase sector and comprising a series of quantized values defining a ramp having a slope approximating the slope of the sine function within the set's corresponding phase sector.

15. The device according to claim 14 wherein each set of extrapolation addends comprises a finite series of values equal to the second term of the Taylor Series expansion about a point on the sine function at a sector boundary phase leadingly defining the set's corresponding sector multiplied by an arithmetically progressive series of integers beginning with zero.

16. The device according to claim 15 wherein the slopes of the ramps defined by the sets of addends are selected to compensate for quantization errors.

17. The device according to claim 14 wherein the slopes of the ramps defined by the sets of addends are selected to compensate for quantization errors.

18. The device according to claim 13 wherein the auxiliary function samples are truncated from a least significant end and the quantized addends are selected to reduce quantization errors introduced by the truncation to selected limits.

19. The device according to claim 7 wherein the auxiliary function samples define a stair-step function following the sine function through said portion of the sine function period.

20. The device according to claim 21 wherein the first memory has prestored therein samples $C_1(n)$, the second memory has prestored therein samples $C_2(n)$, and the third memory has prestored therein samples $C_3(k)$ as follows: sample memory having a twelve-bit resolution output ($K=12$), $$C_1(n) = Int\left(\frac{2048 + Int\left(2047 \times \sin\left(\frac{n\pi}{32}\right)\right)}{64}\right) \times 64$$

for $n = 0$ to 15, $$C_2(n) = \left(2048 + Int\left(2047 \times \sin\left(\frac{n\pi}{512}\right)\right)\right) - C_1(n)$$

for $n = 0$ to 255, and $$C_3(k) = Int\left(k \times \frac{1}{16} \{13.4, 13.2, 13.2, 12.5, 11.7, 10.8, 10.2, 9.3, 8.5, 7.3, 6.1, 5.1, 3.9, 2.6, 2.1\}\right)$$

for $k = 0$ to 15.

* * * * *